United States Statutory Invention Registration [19]

[11] Reg. Number: H893

Davidson et al. [43] Published: Mar. 5, 1991

[54] SLIDE VALVE FOR A BULK SUBSTANCE CONTAINER

[76] Inventors: John E. Davidson, 575 Prince Edward Rd., Glen Ellyn, Ill. 60137; Peter R. Gauthier, 340 Du Marquis Street, Tracy, Quebec, Canada, J3R 2T5

[21] Appl. No.: 424,070

[22] Filed: Oct. 19, 1989

[51] Int. Cl.[5] ..... B67D 5/06

[52] U.S. Cl. ..... 222/561; 222/185; 222/186

[58] Field of Search ..... 222/561, 185, 186

[56] References Cited

U.S. PATENT DOCUMENTS

| | | | |
|---|---|---|---|
| 1,869,751 | 8/1932 | Iacobitti | 222/561 |
| 2,419,182 | 4/1947 | Wells | 222/561 |
| 2,582,207 | 1/1952 | Shaw | 222/185 |
| 2,670,108 | 2/1954 | Skogstad et al. | 222/561 |
| 2,775,368 | 12/1956 | DeVries | 222/561 |
| 2,802,603 | 8/1957 | McCray | 222/185 |
| 3,138,297 | 6/1964 | McKinney | 222/185 |
| 3,179,314 | 4/1965 | Hodgeson et al. | 222/561 |
| 3,433,400 | 3/1969 | Hawkins | 222/185 |
| 3,819,093 | 6/1974 | Forbes, Jr. | 222/561 |
| 4,179,985 | 4/1980 | Austin | 222/561 |
| 4,771,917 | 9/1988 | Heaps, Jr. et al. | 222/185 |

*Primary Examiner*—Linda J. Wallace

[57] ABSTRACT

A box-like container having a bottom support and a tubular body features a slide gate on the tubular body to facilitate the selective removal of bulk pack materials such as metal powders and the like.

11 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

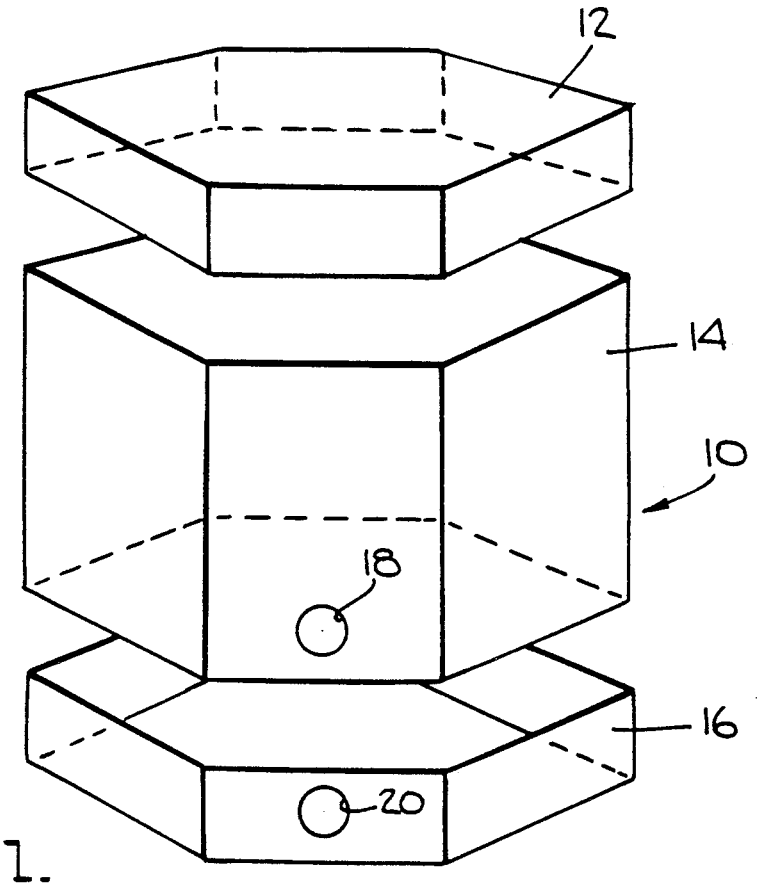
Fig. 1.
Fig. 2.
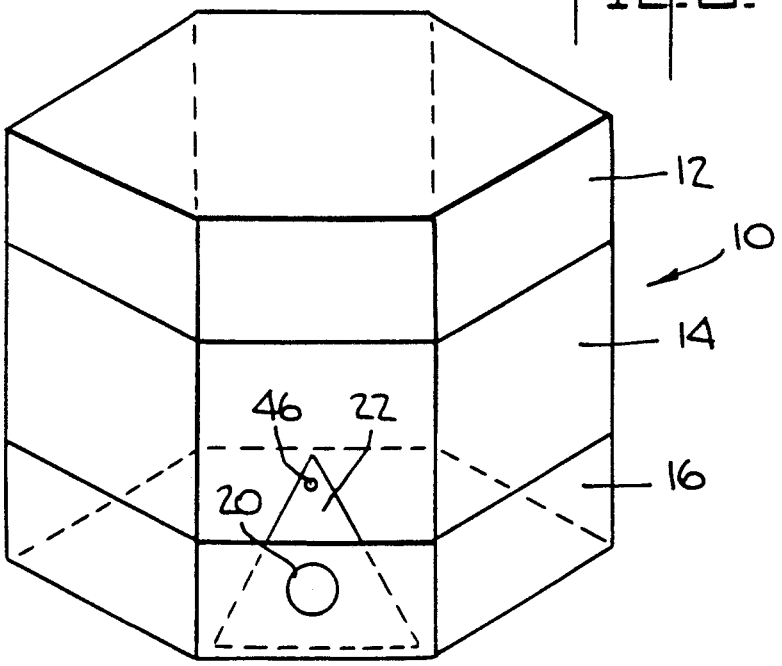

SLIDE VALVE FOR A BULK SUBSTANCE CONTAINER

BACKGROUND OF THE INVENTION

1. Field of the Invention

The present invention relates generally to valves and the like. More particularly, the present invention is directed towards a slide valve for selectively opening an evacuation hole defined in a side wall of a box-like container.

2. Brief Description of the Background Art

Box-like containers are known for storage and transport of various bulk substances, such as metal powders. These containers are usually made of common inexpensive materials including various cellulosic panels widely known as cardboard, fiberboard, particle board and the like, as well as polymeric or metal sheets. The bulk pack containers may be produced in a wide variety of useful shapes. Generally speaking, the methods of filling, storing and evacuating the container, and its torsional strength and rigidity depend upon both its shape and the material of which it is constructed.

Thus, the precise application to which the box is intended often determines its configuration and construction. For these reasons, bulk substance containers are often produced having round, or regular square, pentagonal or hexagonal cross-sections and therefore, are especially strong.

Previously, bulk powdered materials have been delivered to end users in sealed containers without precut openings. Thus, in order to empty the container to utilize the powders, operators first manually cut an opening in the bottom part of the container and bottom cover. Such procedures resulted in numerous accidents to the cutting operators, causing both expense and lost operator time. Additionally, since the bottom cover may be structural to the container, once its integrity is breached, the container may no longer be sufficiently strong to be handled. Moreover, powder losses will occur whenever the container is removed from the fixture at which it is being utilized. This method is therefore rather inconvenient, and also quite messy in that the relatively fluid powders often spill.

In the past, this problem has been addressed by the use of a bottom dumping container having an evacuation opening on the bottom. Such a container utilizes a common rotary disc valve. The rotary disc valve is similar to the arrangement commonly used in grated Italian cheese containers in that it utilizes a discharge port defined in the bottom cover of the container and a rotating disc. The disc, which is usually made of sheet metal, defines an aperture of substantially the same size as that in the container bottom. Since the rotating valve disc is placed inside the container, the weight of the material to be emptied forces the disc against the bottom of the container and seals the bulk material container against leakage. By rotating the disc about its center using a socket and lever until the discharge port and disc aperture are aligned, whereby the container may be emptied. Although rotary disc valved containers are useful, it has been found that they are not compatible with the majority of the bulk material transfer apparatus commonly found in North America. Additionally, even when suitable transfer apparatus is readily available, the rotary disc valved containers are still somewhat inconvenient to use since they can only be opened when placed atop special pallets which define apertures for allowing the socket and lever access to the center of the rotary disc. Thus, other bulk substance containers have been devised which can be utilized with the press feeder system commercially available from, for instance, R. Pettigrew Industries. As seen in FIGS. 3 and 4, such feeder systems include a tilting base and a discharge chute.

The press feeder is operated by placing a pallet with a bulk substance container on the (horizontal) tilting base. A discharge hole is then manually cut in the front side of the bulk substance container in a predetermined location. The pallet is thereafter slid forward until the discharge hole abuts the discharge chute. Of course, powder losses rapidly occur as powder quickly spills from the discharge hole and falls on the fixture and floor while the pallet is being slid up to the discharge chute. The hydraulic base is then tilted so that the bulk pack material flows from the container through the discharge chute. Although such an arrangement provides a container which does not leak during shipping, as noted, powder material still spills during the interval after the discharge hole is cut in the container wall before such discharge hole is made to abut against the discharge chute. Additionally, accidents still occur from the operators inadvertently cutting themselves. Moreover, the bulk substance container cannot be removed from the fixture in which it is installed without spilling additional powder until the container has been completely emptied.

Thus, it is clear that it would be helpful to provide an inexpensive valve arrangement for use with conventional bulk material handling equipment which does not result in the spillage of powder materials or provide the opportunity for operator accidents.

SUMMARY OF THE INVENTION

It is an object of the present invention to provide a valve for a container that precludes the chance of injury due to manual cutting operations.

It is another object of the present invention to provide a valve that presents powder material from spilling when a bulk pack container is opened.

It is yet another object of the present invention to provide a container valve which is usable with conventional press feeder system equipment.

It is an additional object of the present invention to provide an inexpensive valve which does not leak powdered bulk materials during shipping.

In a broad embodiment of the present invention, these objects and others are attained by providing a discharge hole located in the lower side portion of a box-like container which is selectively closed and opened using a guillotine type gate valve. More specifically, in a preferred embodiment, all of these objects are attained by a box-like container for storage and transport of bulk materials comprising a generally tubular body defining an interior cavity, and a bottom support, said container being adapted to rest upon said bottom support; wherein said tubular body includes a throughgoing aperture, said aperture being in proximity to said bottom support and being selectively closed with a substantially planar slide gate.

BRIEF DESCRIPTION OF THE DRAWINGS

The understanding of the present invention will be assisted by reference to the detailed description of preferred embodiments set forth below taken with the attached drawings, in which:

FIG. 1 is a exploded perspective view of a bulk pack container of the present invention;

FIG. 2 is a side view of the assembled container of FIG. 1 with a triangular metal slide gate;

DETAILED DESCRIPTION OF THE INVENTION

Figure 3:
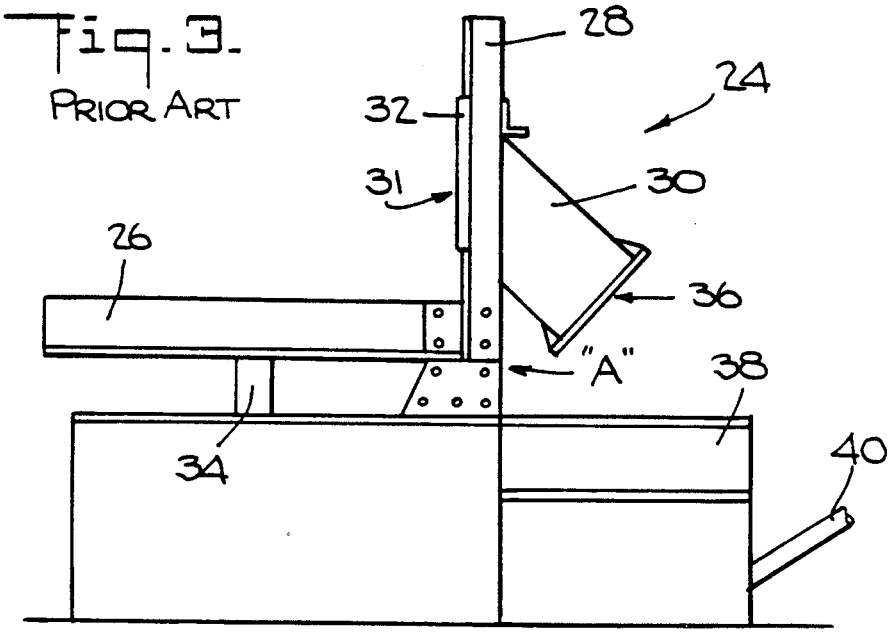
Fig. 3. PRIOR ART
FIGS. 3 and 4 are side views of conventional press feeder apparatus which are usable with the present invention.

Referring to FIG. 1, the present invention consists of a box-like bulk pack container 10. Bulk pack container 10 includes a top cover 12, a body section 14, and a bottom support cover 16. Body section 14 thus sits in the bottom 16 and top 12 fits over the upper portion of the section 14. Top cover 12 and bottom cover 16 may be adhered to body 14, or they may be secured by a press fit, strapping tape or other suitable means as desired. As seen, body 14 is generally tubular and may have the hexagonal shape illustrated or it may be formed in other configurations which are sufficiently rigid and strong for desired applications.

Top cover 12, body 14 and bottom support cover 16 may independently be constructed of known suitable materials, including but not limited to cellulose sheeting materials such as cardboard, fiberboard and particle board; polymeric materials such as thermosetting or thermoplastic resins, including reinforced plastic materials such as fiberglass; sheet metal and the like. Of course, bulk pack container 10 may be constructed in other conventional manners such as, for example, by forming the top and/or bottom covers using interlocking flaps which are integrally attached to body 14, and the like.

As clearly shown in FIG. 1, an inner evacuation hole 18 perforates through the bottom portion of body section. Also perforating through the overlapping portion of bottom cover 16 is an outer evacuation hole 20. Outer evacuation hole 20 is located so as to be concentrically aligned over inner evacuation hole 18 when bottom cover 16 is installed on body section 14.

Referring to FIG. 2 the bulk substance container 10 of FIG. 1 is seen in an assembled configuration. It is also seen that a triangular slide gate 22 is inserted between the body section 14 and the overlapping portion of bottom support 16. Slide gate 22 is formed of any material which is sufficiently strong to retain the contents of container 10. Generally, slide gate 22 will be selected from any of the materials from which top 12, body 14 and bottom 16 may be produced. Slide gate 22 is positioned in order to seal both inner and outer evacuation holes 18 and 20.

In addition to being secured against body 14 by inward pressure from bottom support 16, slide gate 22 may be taped to body 14 during shipment. Moreover, if the bottom of bulk pack container 10 is formed by other suitable means, such as the interlocking flaps mentioned above, or if the bottom support has overlapping portions which are too small to sufficiently retain slide gate 22, slide gate 22 may be restrained against body 14 using any of strapping tape, polymer or metal bands, and the like. In this event, if inner evacuation hole 18 is located sufficiently high above bottom support 16, outer evacuation hole 20 may be omitted.

Figure 4:
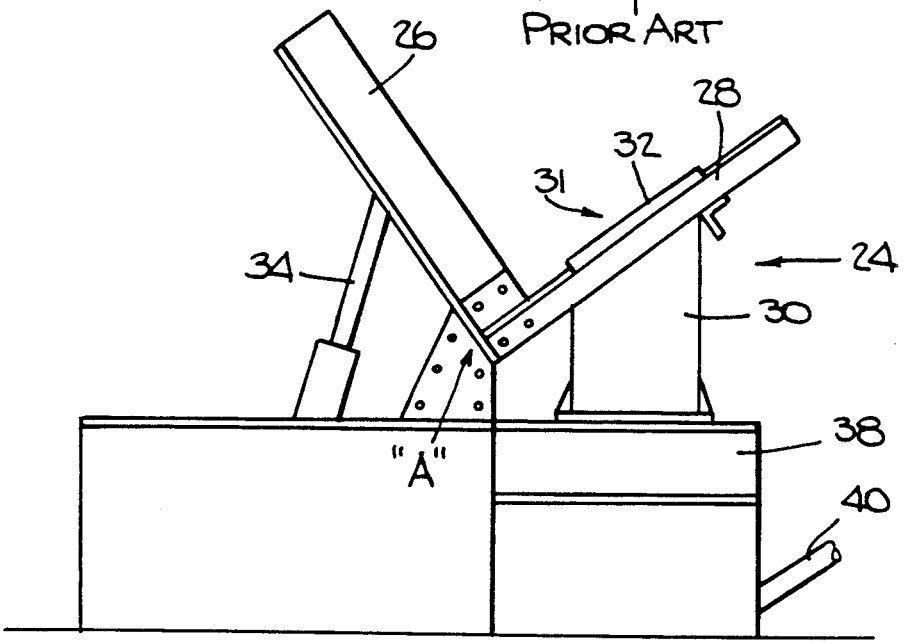
Fig. 4. PRIOR ART

Bulk pack container is intended to be utilized on conventional feeder apparatus 24 best seen in FIGS. 3 and 4. As illustrated, press feeder 24 includes a table 26 which provides vertical supports 28. Attached to vertical supports 28 is a discharge spout 30 having a bulk material inflow end 31. Discharge spout inflow end 31 is preferably circumscribed with a sealing gasket material 32 in order to prevent the loss of bulk material when the bulk substance container 10 is installed thereon. Table 26, vertical supports 28 and discharge spout 30 integrally pivot at "A" using force supplied by cylinder 34 such that outflow end 36 of discharge spout 30 abuts an opening (unillustrated) in the top surface of bulk material collector 38 (see FIG. 4). Bulk material then flows by gravity into material collector 38 and is in turn fed into subsequent process equipment using an auger screw conveyor 40 or other suitable transfer mechanism. It will be noted that, if desired, slide gate 22 can be inserted back into a sealing position between inner and outer evacuation holes 18 and 20, thus resealing bulk substance container 10.

Figure 5:
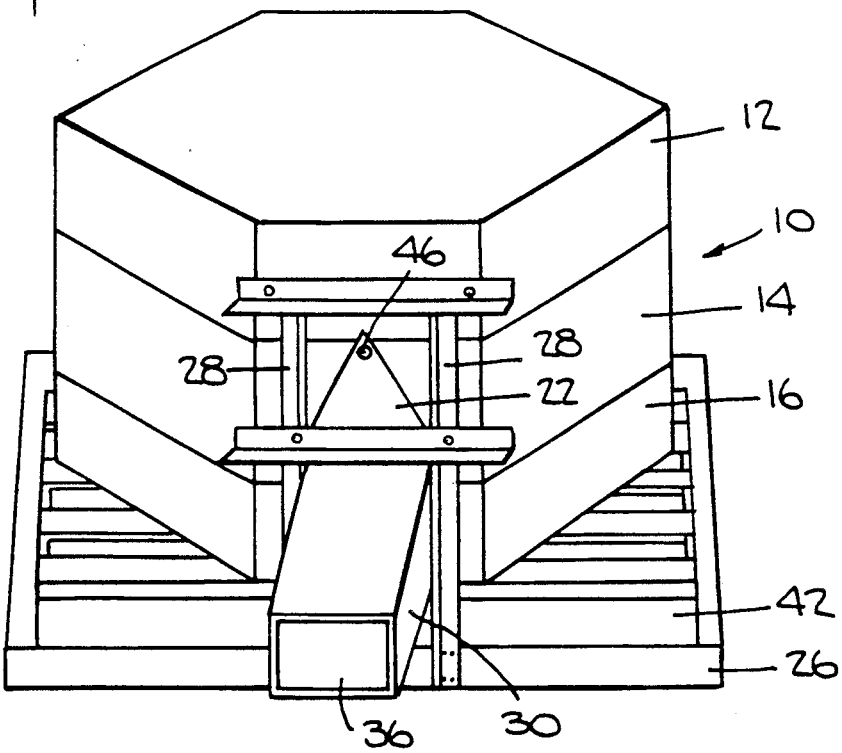
FIG. 5 is a perspective view of a bulk pack container of the present invention installed on the press feeder of FIGS. 3 and 4.

To install the bulk substance container 10 of the present invention on feeder apparatus 24, container 10 is placed onto table 26 atop a pallet 42 (see FIG. 5). Pallet 42 is then oriented so that outer evacuation hole 20 sealingly abuts gasket material 32 surrounding the material inflow opening 31 (see FIGS. 3 and 4) of discharge chute 30. Table 26 is then tilted hydraulically to the position illustrated in FIG. 4 and the slide gate 22 is removed from between body 14 and bottom support 16, thus unobstructing inner and outer evacuation holes 18 and 20. In certain instances, it will be understood that it may be preferable to utilize the present invention by sealingly abutting outer evacuation hole 20 against gasket material 32, removing slide gate 22 from between body 14 and bottom support 16 to unobstruct evacuation holes 18 and 20, and then tilting table 26 to the position of FIG. 4.

To facilitate the removal of slide gate 22, a bent over protruding lip (unillustrated) may be formed as a handle at its top edge. More preferably, however, a small hole 46 is located towards an edge or apex of slide gate 22 which would be exposed when bulk substance container 10 abuts discharge chute material inflow opening 31. This enables an operator to expose evacuation holes 18 and 20 to allow the removal of the powdered material contained therein by inserting a removal tool (unillustrated) into hole 46 and lift slide gate 22 upward in a vertical direction along the axis of body 14 of container 10. It will be appreciated that it may be preferable to tilt or pivot slide gate 22 by a sideways motion to expose evacuation holes 18 and 20, as such requires less thrust on the part of the operator. Thus, triangular slide gate 22 may be made to either "stand" on an apex to pivot away from inner and outer evacuation holes 18 and 20, or rest upon an edge, although triangular slide gate 22 will usually rest upon an edge to preclude inadvertent unsealing of bulk substance container 20 such as, for example, during shipping.

The removal tool may simply be a 1½ foot long steel rod of 3/16 inch diameter having an open-ended loop defining a hook at one end, and a handle at the other. Thus, the hook is "threaded" through hole 46 so that tension can be applied to displace slide gate 22. Although use of the removal tool is not necessary, it makes it easier to open evacuation holes 18 and 20 because vertical supports 28 and discharge spout 30 generally constrict the space available for manually removing slide gate 22.

Figure 6:
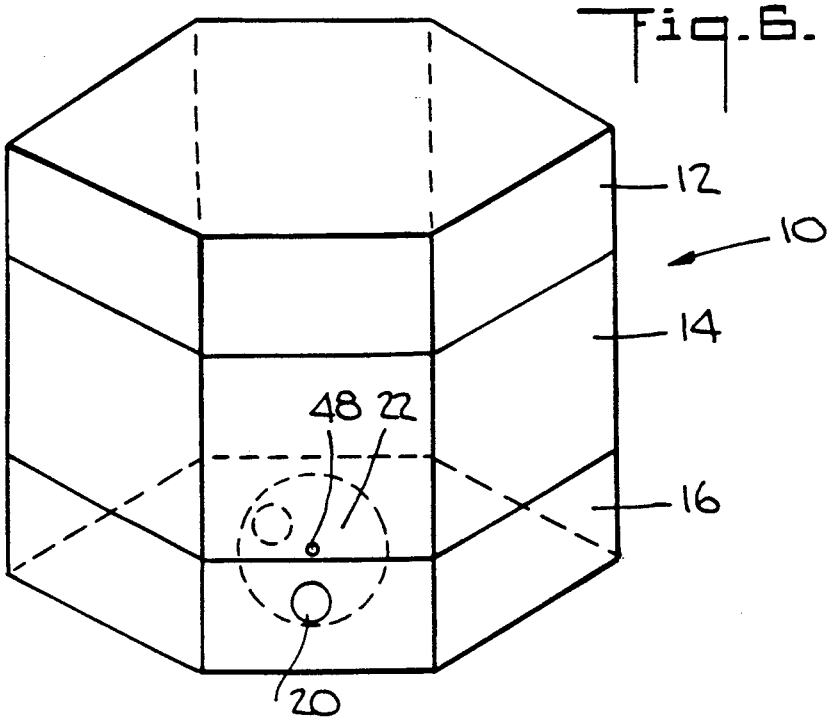
FIG. 6 is a side view of another embodiment of the assembled container of the present invention.

It may also be preferable in certain applications to configure slide gate 22 in a round shape since such is particularly suitable for rotation. Thus, as round slide gate 22 need not be slidably displaced, bulk pack container 10 but can in fact be opened by rotating slide gate 22 about its circumference. Similarly, it may be preferable to have a square-shaped slide gate 22. Moreover, it is also possible to install a rotary valve gate similar to that utilized on the bottom dumping container which was previously discussed, if such valve is located near the bottom of container body 14, in accordance with the present invention as illustrated in FIG. 6 (wherein 48 denotes the aforementioned socket which is utilized to rotate value disc 22).

It should be understood that various modifications can be made to the preferred embodiments disclosed herein without departing from the spirit and scope of the present invention or without the loss of its attendant advantages. Thus, other examples applying the principles herein described are intended to fall within the scope of the present invention provided the features stated in any of the following claims or the equivalent of such be employed.

What is claimed is:

1. A box-like container for storage and transport of bulk materials, said container comprising a generally tubular body defining an interior cavity, and a bottom support, said container being adapted to rest upon said bottom support; wherein said tubular body includes a throughgoing aperture, said aperture being in proximity to said bottom support and being selectively closed with a substantially planar slide gate.

2. The box-like container according to claim 1, wherein said tubular body and bottom support are of cellulosic materials.

3. The box-like container according to claim 1, wherein said tubular body and bottom support are of polymeric materials.

4. The box-like container according to claim 1, wherein said tubular body and bottom support are of sheet metal.

5. The box-like container according to any one of claims 1–4, wherein said slide gate is metal.

6. The box-like container according to claim 1, wherein said slide gate is forced outwardly against said tubular body inside said interior cavity, said slide gate being rotatable about a point and defining an aperture adapted to overlap said throughgoing aperture in said tubular body.

7. The box-like container according to claim 1, wherein said slide gate is outside of said tubular body and is forced inwardly against said tubular body.

8. The box-like container according to claim 7, wherein said bottom support provides portions which overlap the outside of said tubular body.

9. The box-like container according to claim 8, wherein said overlapping portions of said bottom support bias said slide gate inwardly against said tubular body.

10. The box-like container according to either of claims 8 or 9, wherein said overlapping portions of said bottom support define an aperture adapted to overlap said throughgoing aperture in said tubular body.

11. The box-like container according to any one of claims 7–9, wherein said slide gate is triangular.

* * * * *